United States Patent [19]

Mohl et al.

[11] Patent Number: 4,462,275
[45] Date of Patent: Jul. 31, 1984

[54] ELECTRONIC CONTROL FOR A STEPLESS VEHICLE TRANSMISSION USING A CONTROL MEMBER RESPONSIVE TO STATIC PRESSURE

[75] Inventors: Helmut Mohl, Schwieberdingen; Manfred Schwab, Gerlingen; Joseph Sauer, Schwieberdingen; Alfred Müller, Leonberg; Heinz Leiber, Leimen; Armin Czinczel, Schwetzingen, all of Fed. Rep. of Germany

[73] Assignee: Robert Bosch GmbH, Stuttgart, Fed. Rep. of Germany

[21] Appl. No.: 186,319

[22] Filed: Sep. 11, 1980

[30] Foreign Application Priority Data

Sep. 12, 1979 [DE] Fed. Rep. of Germany ....... 2936784
Jan. 9, 1980 [DE] Fed. Rep. of Germany ....... 3000581

[51] Int. Cl.³ .................... B60K 41/10; G06F 15/50
[52] U.S. Cl. .................... 74/866; 364/424.1; 474/12; 474/18
[58] Field of Search .......... 74/863, 864, 866, 752 D; 474/18, 28, 11, 12; 364/424.1

[56] References Cited

U.S. PATENT DOCUMENTS

| | | | |
|---|---|---|---|
| 3,115,049 | 12/1963 | Moan | 74/868 |
| 4,091,690 | 5/1978 | Miyao | 74/865 |
| 4,106,367 | 8/1978 | Bouvet | 74/866 |
| 4,152,947 | 5/1979 | van Deursen et al. | 474/11 |
| 4,241,618 | 12/1980 | Smirl | 474/18 |
| 4,246,807 | 1/1981 | Kofink | 474/18 |
| 4,261,229 | 4/1981 | Mizuno et al. | 74/866 |
| 4,274,520 | 6/1981 | Van der Hardt Aberson | 474/28 |

Primary Examiner—Allan D. Herrmann
Assistant Examiner—Bruce F. Wojciechowski
Attorney, Agent, or Firm—Frishauf, Holtz, Goodman & Woodward

[57] ABSTRACT

To control transmission ratio of a continuously variable transmission connected to a combustion engine (e.g., for optimal fuel efficiency of a powered vehicle), effective diameter of pulleys is controlled in response to an electrical signal. A control signal suitable for comparison with hydrostatic pressure values is produced by a computing device based on input signals representing load, speed, and other operating conditions and based further on stored data representing engine characteristics. A control signal is conveniently used to control hydrostatic pressure by means of electromagnetically operated valves. Especially when pulsed valves controlled by digital electric signals are used, a reservoir is used to establish a steady hydrostatic pressure. Such control device is readily adapted to different engines by replacement of stored characteristic data.

7 Claims, 4 Drawing Figures

ELECTRONIC CONTROL FOR A STEPLESS VEHICLE TRANSMISSION USING A CONTROL MEMBER RESPONSIVE TO STATIC PRESSURE

CROSS-REFERENCE TO RELATED APPLICATION AND PATENT

U.S. application Ser. No. 172,239, filed July 25, 1980, entitled "Apparatus for Decreasing Jolts During Gear Shifts in Automatic Transmissions in Motor Vehicles", by H. Mohl et al. and U.S. Pat. No. 4,387,608 to Helmut MOHL entitled "Electronic Control of Stepless Vehicle Transmission Using a Control Member Response to Dynamic Pressure". These disclosures are hereby incorporated by reference into the present application.

This invention is concerned with stepless (continuously variable, infinitely variable) transmissions and, more particularly, with the control of transmission ratio in such transmissions.

BACKGROUND AND PRIOR ART

To adjust effective diameter of pulleys in hydraulically and/or pneumatically controlled V-belt drives in continuously variable transmissions, known control devices rely on mechanical linkage to transmit a change in the position of the accelerator pedal so as to turn a cam plate which acts on a control element. Such continuously variable transmissions are used, e.g., in the interest of fuel efficient operation of a combustion engine. To this effect, control of the transmission aims at adjustment of transmission ratio so as to allow the engine of a vehicle to operate at optimal rotational rate and to produce optimal torque (optimal with respect to fuel efficiency under all load conditions. Known control devices tend to be difficult to adjust to different types of combustion engines having different curves of optimal torque; moreover, mechanical transmission of the position of the acclerator pedal may be subject to linkage errors.

THE INVENTION

It is an object of the invention to provide for direct, accurate control of a continuously variable transmission based on combustion engine characteristics and load conditions.

In accordance with the invention, a control parameter is produced in the form of an electrical signal by an electronic control device, taking into account load conditions and engine speed. The electrical signal may electromechanically influence a control element or, alternatively, may be transformed into a hydrostatic signal which hydraulically or pneumatically influences a control element (the term hydrostatic is used herein to refer to static fluid pressure generally, i.e. to include "pneumostatic" in its meaning).

One and the same control system may serve for the control of different types of engines as may be used, e.g., in moving vehicles such as, e.g., cars, buses and trucks and also off-the-road vehicles such as tractors; to this end, a small computing device such as, e.g., a microprocessor may be conveniently incorporated in the control system. Use of different memory modules in such computing device allows for convenient adaptation to different engine characteristics and, possibly, to other data as stored in such memory module.

Specific embodiments of the invention may incorporate a pump which may operate in an idle mode as long as pressure in a pressure vessel is at or above a desired level. In that condition the pump operates directly into a bypass with little power consumption. Only when energy is removed from the pressure vessel to shift the transmission, thus when the pressure in the pressure vessel sinks, the "idle" valve switches back to the condition in which the pump builds up the pressure in the vessel. The idle valve is so constituted that it has hysteresis of between the switching in and switching out of the idling condition.

It is also possible, by having the control system deliver separate signals respectively for control of the pressures acting on the two pulleys separately, to avoid the necessity of having mechanical hunting means within the transmission control. With suitable construction the electrical signal delivered by the control system can operate directly on a positioning member of the transmission. In many cases the construction is simpler if the electrical signal of the control system is first converted into a pressure signal, preferably a hydraulic pressure signal.

THE DRAWING

DESCRIPTION OF THE ILLUSTRATED EMBODIMENT

Figure 1:
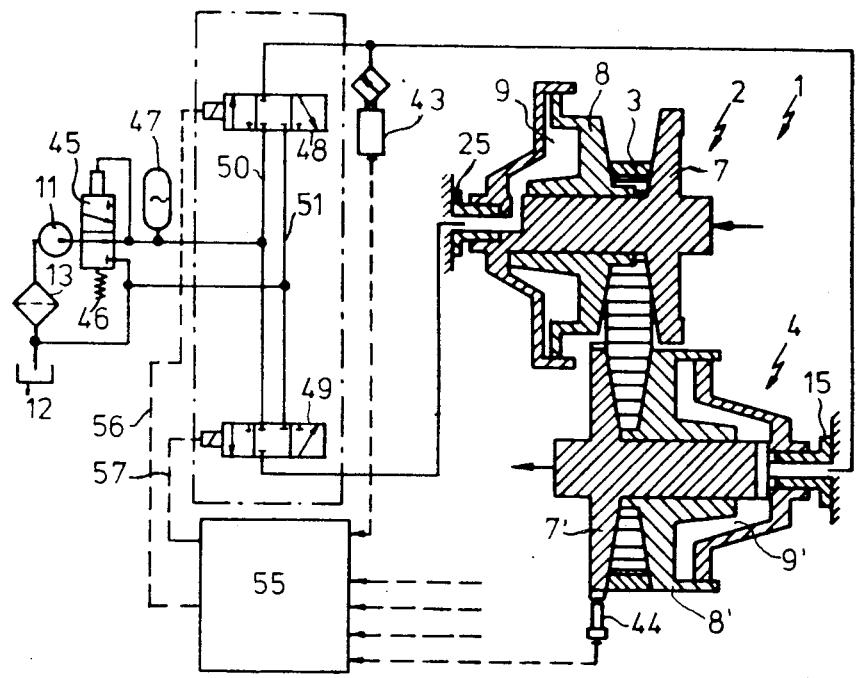
FIG. 1 shows a V-belt transmission with a first embodiment of a control device according to the invention.

Shown in FIG. 1 is a V-belt drive 1 in which a first pulley 2 is driven by the combustion engine of a powered vehicle. By means of V-belt 3, first pulley 2 drives a second pulley 4 which is connected with the drive wheels of the vehicle. Parts 7 and 8 of pulley 2 are axially movable relative to each other but rotate as a whole; the same holds for pulleys 7' and 8'. Upon introduction of a fluid such as, e.g., a liquid under pressure into a space 9 or 9', movable part 8 or 8', respectively, is shifted relative to stationary part 7 and 7', respectively. As a result of such shifting, the annular gap narrows in which V-belt 3 is located between parts 7 and 8 or 7' and 8', respectively. This, in turn, results in shifting of V-belt 3 towards the perimeter of the respective pulley 2 or 4, and the effective diameter of such pulley is enlarged. If pressure is reduced in space 9 or 9', parts 7 and 8 or 7' and 8', respectively, are pressed apart by belt 3', provided belt 3 is under sufficient tension. A hydraulic fluid is supplied by pump 11 from reservoir 12 via filter 13; such fluid passes from the delivery side of pump 11 via valves (yet to be described) to hydraulic connecting pieces 15 and 25 of pulleys 4 and 2, respectively. The delivery side of pump 11 is connected to the inlet of an idle valve 45 whose valve element is subject to opposing forces from spring 46 on the one hand and pressure prevailing at the outlet of valve 45 on the other. When such outlet pressure reaches a predetermined value, hydraulic fluid supplied by pump 11 is returned by valve 45 to pump 11. In this case, hydraulic fluid returns to pump 11 essentially at ambient pressure, requiring minimal pumping effort. The outlet of idle valve 45 is further connected to pressure vessel 47 as well as to 3/3 valves 48 and 49 having three switching positions and three connections. Depending on switching position, valves 48 and 49 cause pressure in corresponding V-belt pulleys either to increase, to remain constant, or to drop. Switching positions shown in FIG. 1 correspond to constant pressure). In the case of increasing pressure, respective connecting piece 25 or 15 is connected to the outlet port of the corresponding valve 49 or 48, respectively and, thereby, to pressure vessel 47; in the case of decreasing pressure, respective connection piece 25 or 15 is connected to the return port of the corresponding valve 49 or 48, respectively and, thereby, to reservoir 12. The inlets of valves 48 and 49 are connected to pressure vessel 47 as well as mutually among each other, and return ports are connected to reservoir 12 via a path including duct 51. Valves 48 and 49 are controlled by electrical signals which are provided by electronic control device 55. Separate output connections 56 and 57 lead from device 55 to electrical input connections of valves 48 and 49. Control device 55 is supplied by tachometer 44 with a signal representing rate of rotation of pulley 4 and, as further indicated by broken horizontal arrows, with input signals corresponding to transmission functions, to load (as may be suitably derived, e.g., from the position of the throttle valve or from the strength of a vacuum in the carburator inlet), and, finally, to the speed of rotation of the engine. Furthermore, control device 55 is supplied with a signal from pressure sensor 43 commensurate with pressure in connecting piece 15. These signals are used by control device 55 to determine a transmission ratio for V-belt transmission 1 based on engine characteristics for minimal consumption of fuel as a function of load and speed conditions. In accordance with such determination, valves 48 and 49 are magnetically actuated. Any deviation of actual transmission ratio from nominal transmission ratio may be monitored by comparing rotational rates. (Solid lines in FIG. 1 represent hydraulic connections, broken lines represent electrical connections).

Figures 2, 4:
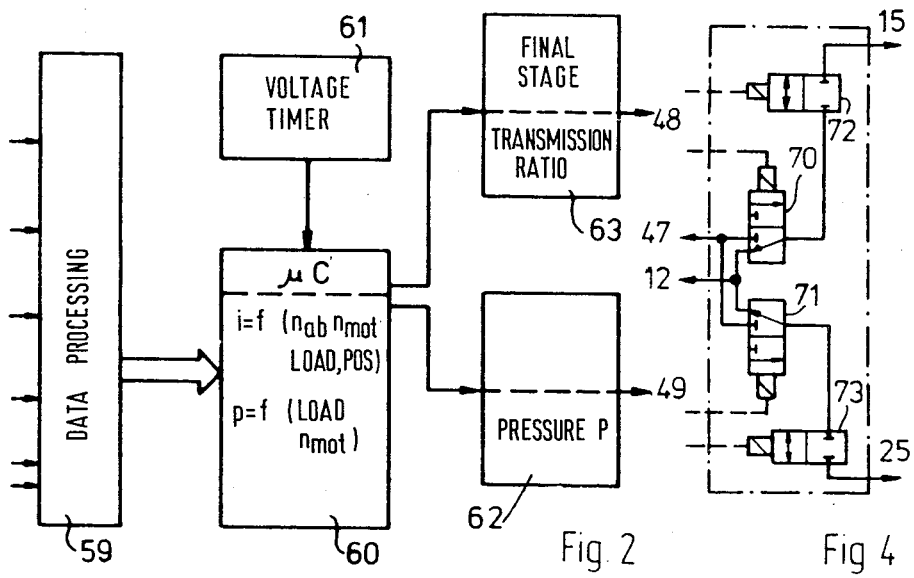
FIG. 2 is a circuit diagram of the control device used according to FIG. 1.
FIG. 4 shows a control device alternate to the control device shown in FIG. 1.
Figure 3:
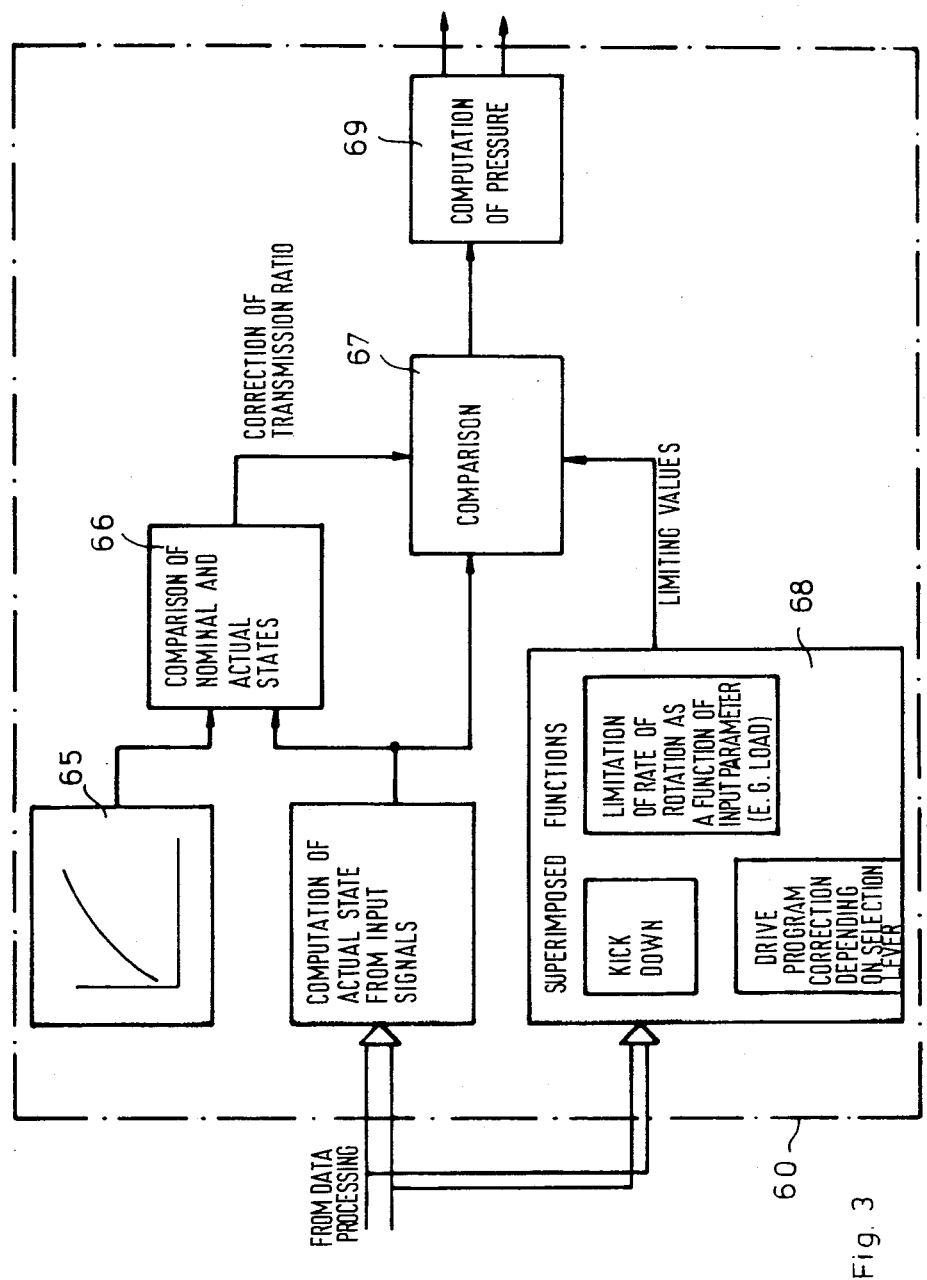
FIG. 3 shows, in detail, a portion of the control device according to FIG. 2.

Components of control device 55 of FIG. 1 are shown in FIG. 2. Data processing device 59 receives signals corresponding to rotational rate of pulley 4, rotational rate of the engine, load conditions, and position of a selector lever of the transmission (e.g., positions for reverse, idle, low, and high), and transforms these signals into a form suitable for further processing. The signals are fed to microprocessor 60 which is connected to a voltage source and a timing device 61. The output signals of microprocessor 60 are fed to final stages 62 and 63, they are amplified, and then fed to valves 48 and 49. Microprocessor 60 serves as a computer for determining transmission ratio. As illustrated in FIG. 3, such determination involves ascertaining actual operating conditions of the engine and the transmission and, based on fuel consumption data stored in memory 65, producing the optimal transmission ratio. Actual and optimal transmission ratios are compared by comparator 66 whose output signal is fed to an additional comparator 67. Comparator 67 receives additional signals through a second input for critical limit values; these critical values are determined by unit 68 which produces maximum and minimum rotational speeds as a function of input parameters and which limits transmission ratio depending on position of the selector lever and of the kickdown switch.

The output signal of comparator 67 corresponds to the nominal value of the transmission ratio, and it is this value which is used by computer 69 to determine the signals for controlling electromagnetic valves 48 and 49. This requires recognition that pressure in pulleys 2 and 4 is directly related to the magnitude of torque transmitted.

Components framed by chain-dotted lines in FIG. 1 may be replaced by components shown in FIG. 4. In the resulting alternate embodiment of the invention, 3/3-valve 48 of FIG. 1 is replaced by a combination of a 3/2 (3-port 2-position) valve 70 and a 2/2 valve 72. Similarly, 3/3 valve 49 is replaced by a combination of a 3/2 valve 73. In the position shown, valves 72 and 73 are blocked and pressure is held constant in pulleys 2 and 4. If valves 72 and 73 are in their alternate position, pressure in chambers 9 and 9' can be increased or decreased depending on the position of valves 70 and 71. Valves 70, 71, 72, and 73 are of the electromagnetic type and are controlled by electrical signals provided by control device 55 which, in the alternate embodiment, is designed to control four valves (as contrasted with two in FIG. 1). Input signals to control device 55 in the alternate embodiment are the same as in FIG. 1.

The invention is more generally applicable to any continuously variable transmission and, in particular, to transmissions involving control of effective diameter of discs or wheels. Included are, e.g., continuously variable link belt drives.

We claim:

1. In a continuously variable transmission for a vehicle powered by a combustion engine, a control system for adjusting transmission ratio as a function of input parameters representing load and rate of rotation which includes first (8) and second (8') positioning elements together determining the transmission ratio, wherein, in accordance with the invention, that control system includes:

first actuating means (49;71,73) for actuating said first positioning element (8) in response to hydrostatic pressure in a fluid;

second actuating means (48;70,72) constituted and operated separately from said first actuating means, for actuating said second positioning element (8') in response to said hydrostatic pressure in said fluid;

means (11,47) for providing a hydrostatic pressure in said fluid, and an electronic control device (55) comprising computing means (60) for producing first and second electrical output signals as a function of said input parameters, said first actuating means including at least one valve for controlling, in response to said first electrical output signal, the hydrostatic pressure provided by said pressure providing means (11,47) to a hydraulic medium input port (25) of said first positioning element (8), said second actuating means including at least one valve for controlling in response to said electrical output signal the hydrostatic pressure provided by said pressure providing means (47) to a hydraulic medium input port (15) of said second positioning means (8'), said at least one valve of said first actuating means and said at least one valve of said second actuating means being selectively controllable independently of each other by said electronic control device by said first and second output signals thereof.

2. Control system according to claim 1 in which said pressure providing means comprise a pump (11) and a vessel (47) which contains said fluid under pressure produced by such pump (11).

3. Control system according to claim 2 comprising an idle valve (45) for decoupling said pump (11) from said vessel (47) when pressure in said vessel (47) exceeds a predetermined level.

4. Control system according to claim 1 comprising a pressure sensor (43) for producing an electrical signal representing pressure of said fluid, said pressure sensor (43) being electrically connected to said electronic device (55).

5. Control system according to claim 1 in which said first actuating means include a first 2-port 2-position valve (73) and a first 3-port 2-position valve (71) for controlling hydrostatic pressure, the inlet of said first 2/2 valve being connected to the outlet of said first 3/2 valve, and in which said second actuating means include a second 2/2 valve and a second 3/2 valve, the inlet of said second 2/2 valve being connected to the outlet of said second 3/2 valve.

6. Control system according to claim 2 in which said first actuating means include a first 3-port 3-position valve (49) for controlling hydrostatic pressure and said second actuating means include a second 3-port 3-position valve (48) for controlling hydrostatic pressure, inlet ports of said 3/3 valves (48,49) being connected to the delivery port of said pump (11) and return ports of said 3/3 valves (48,49) being jointly connected to the intake port of said pump.

7. Control system according to claim 1 further comprising a memory device (65) for storing characteristic engine data.

* * * * *